(12) United States Patent
Puleo

(10) Patent No.: US 6,431,740 B1
(45) Date of Patent: Aug. 13, 2002

(54) FIBER OPTIC CHRISTMAS TREE

(76) Inventor: Anthony Puleo, 3630 Kennedy Rd., South Plainfield, NJ (US) 07080

(*) Notice: Subject to any disclaimer, the term of this patent is extended or adjusted under 35 U.S.C. 154(b) by 0 days.

(21) Appl. No.: 09/572,952

(22) Filed: May 18, 2000

(51) Int. Cl.[7] .................................................. F21V 8/00
(52) U.S. Cl. ........................................ 362/568; 362/123
(58) Field of Search ................................ 362/568, 567, 362/123

(56) References Cited

U.S. PATENT DOCUMENTS

| | | | | |
|---|---|---|---|---|
| 5,422,797 A | * | 6/1995 | Shattan | 362/123 |
| 5,558,422 A | * | 9/1996 | Sanford | 362/565 |
| 5,702,170 A | * | 12/1997 | Broderick | 362/568 |
| 5,820,248 A | * | 10/1998 | Ferguson | 362/123 |
| 5,829,863 A | * | 11/1998 | Gutshall | 362/123 |

OTHER PUBLICATIONS

Christmas Products catalog sheet; F/O 18"–72" Tree with Decorations; Jin Jiang Hao Li Lai Toy & Electron Co., Ltd.

* cited by examiner

Primary Examiner—Sandra O'Shea
Assistant Examiner—Ronald E. DelGizzi
(74) Attorney, Agent, or Firm—Jacobson Holman, PLLC

(57) ABSTRACT

An artificial Christmas tree incorporating a large number of fiber optic strands with one end of each strand terminating between, adjacent to or closely associated with the tip ends of the simulated needles at the outer end portions of the branches or stems on the Christmas tree. The other end of each of the fiber optic strands terminates above and in alignment with colored segments of a rotatable color wheel which overlies a light source. The color wheel is motor driven and when it rotates and the light source is energized, the fiber optic strands will transmit changing colors to the terminal ends of the fiber optic strands adjacent the tip ends of the needles thereby providing a Christmas tree that includes a large number of illuminated terminal ends of the fiber optic strands which continuously change color.

13 Claims, 6 Drawing Sheets

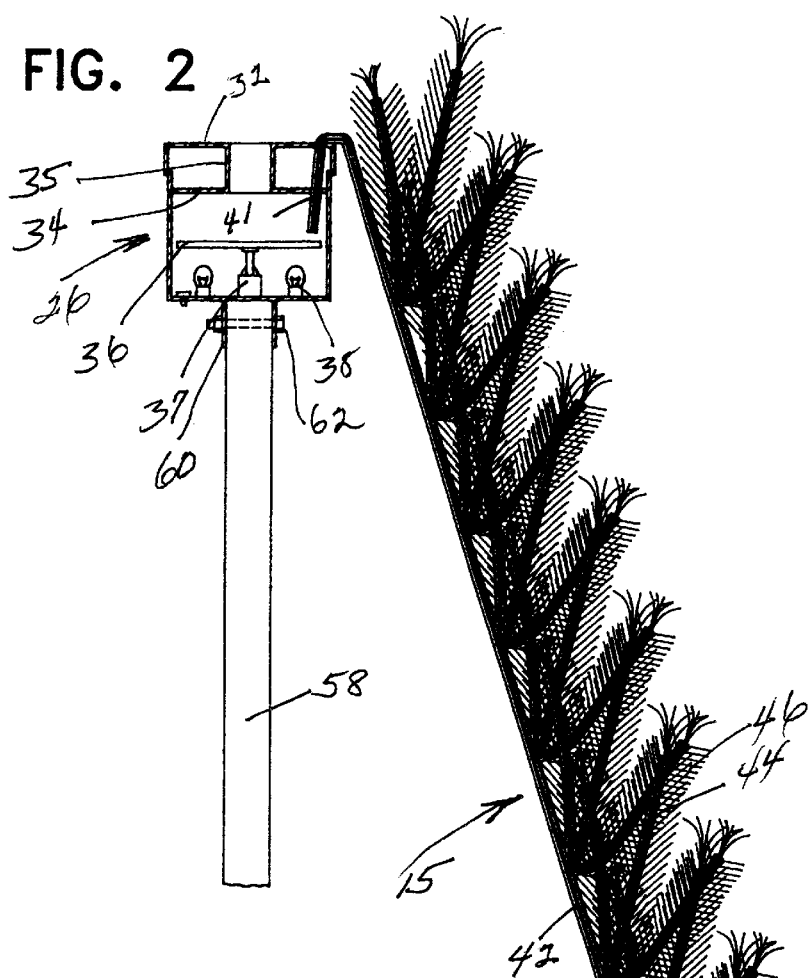
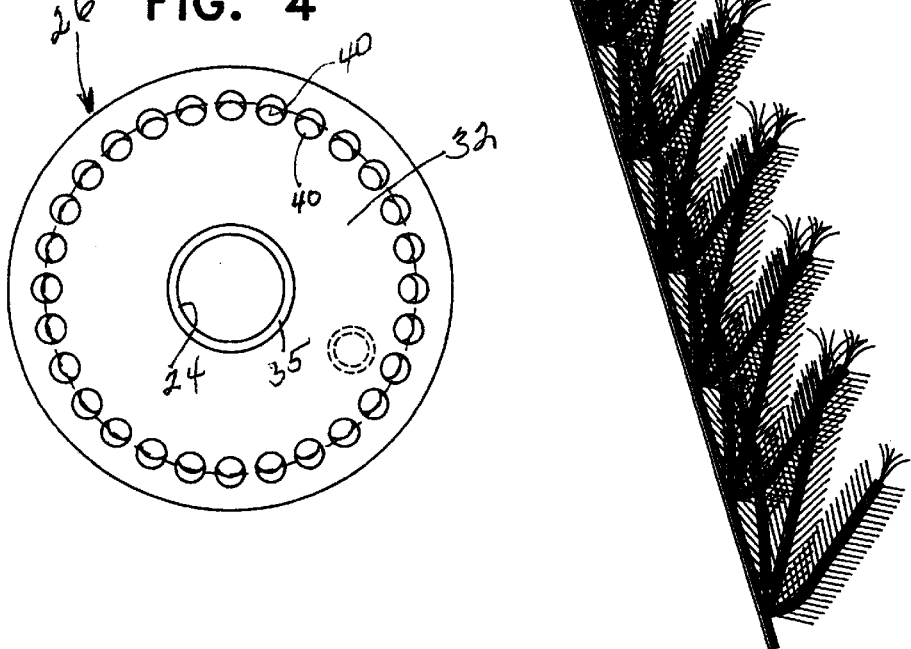

FIBER OPTIC CHRISTMAS TREE

BACKGROUND OF THE INVENTION

1. Field of the Invention

The present invention generally relates to artificial Christmas trees and, more specifically, to Christmas trees or other decorative trees which incorporate a large number of fiber optic strands with one end of each strand terminating between, adjacent to or closely associated with the tip ends of simulated needles on the tree. The other end of each fiber optic strand terminates adjacent to and in alignment with colored segments of a rotatable color wheel with a light source oriented adjacent to an opposite surface of the color wheel to illuminate the ends of the fiber optic strands adjacent the color wheel with changing colors. The color wheel is motor driven and when it rotates and the light source is energized, the fiber optic strands will transmit changing colors to the terminal ends of the fiber optic strands adjacent the tip ends of the needles thereby providing a decorative tree that includes a large number of illuminated terminal ends of the fiber optic strands which continuously change color in accordance with the arrangement of transparent color segments in the color wheel.

2. Description of the Prior Art

Small fiber optic Christmas trees having a height generally ranging from 2 feet to 4 feet are well known and commercially available. Such trees include a hollow main stem or trunk and a plurality of branches having simulated tree needles, usually shredded green polyvinyl chloride (PVC), mounted thereon. A plurality of fiber optic strands extend into and along the branches and have terminal ends near the tips of the branches and the needles. The fiber optic strands extend from the branches down through the center of the hollow main stem or trunk. The main stem or trunk is supported on a housing generally in the form of a container or pot having a socket in its upper end telescopically receiving the lower end of the main stem or trunk. A motor driven rotatable color wheel is mounted in the housing or pot and a halogen light is mounted under the color wheel so that the rotating color wheel will illuminate the ends of the fiber optic strands at the lower end of the main stem with different colors. The main stem or trunk must have a diameter sufficient to receive a large number of fiber optic strands which terminate at the lower end of the main stem or trunk.

In view of the size limitations of the main stem, presently available fiber optic Christmas trees are relatively small and usually have a maximum total length, including the supporting housing or pot of approximately 48 inches or less. Efforts to construct a taller tree, such as one 6, 7 or 8 feet tall, by using the techniques now available would necessarily result in an extremely large diameter main stem or trunk in view of the large number of fiber optic strands necessary to construct such a taller artificial Christmas tree with fiber optic changing color illumination. Accordingly, to date, artificial Christmas trees with changeable color fiber optic illumination having a height of 6, 7 or 8 feet are not available since the large number of fiber optic strands necessary in the construction of fiber optic artificial Christmas trees of greater heights results in an unsightly and undesirably large main stem or trunk.

SUMMARY OF THE INVENTION

In the panel construction of artificial Christmas trees without fiber optics having heights greater than about 4 feet, it is customary to provide a vertical main stem or trunk, usually hollow, supported by a stand at the lower end and having a socket at the upper end for telescopically and frictionally receiving a top section of the tree which is of integrated construction. Also, a plurality of downwardly and outwardly inclined panels are supported from the upper end of the main stem or trunk. Usually, each of the panels includes a substantially rigid member of wire terminating at its upper end in a downwardly opening hook which hooks into supporting holes in a plate or over a supporting ring at the upper end of the main stem or trunk. A ring is usually supported from the stem or trunk at a lower portion thereof with the ring supportingly engaging an intermediate portion of each of the panels to retain the panels in a conical configuration as a continuation of the top tree section. The top tree section and all of the panels have branches or stems with simulated needles attached thereto usually of shredded green PVC. The stems, branches or panels are somewhat bendable to enable them to be oriented in desired locations in order to provide a continuity to the external appearance characteristics of the artificial Christmas tree.

The present invention utilizes a structural arrangement similar to the conventional artificial tree described above. However, the structure is configured to provide changeable color fiber optic illumination of the tip end area of the needles at the outer ends of the branches or stems throughout the vertical and circumferential extent of the full tree from top to bottom. The integrated top tree section of the Christmas tree of this invention is similar to an existing small fiber optic Christmas tree. This top tree section includes a trunk having bendable branches or stems and PVC simulated needles permanently secured thereto. The branches are normally oriented in an upwardly and outwardly inclined relation to the top section trunk. Each of the branches or stems includes a large number of fiber optic strands with the strands extending to points adjacent the tip ends of the needles at the outer ends of the branches or stems and usually arranged in clusters. The fiber optic strands then extend downwardly in the top section trunk and terminate in exposed ends at the lower end of the top section trunk. The lower ends of the strands are then exposed to a motor driven rotatable color wheel and a light source on the opposite side of the color wheel from the fiber optic strands. The rotatable color wheel, drive motor and light source are positioned inside a supporting housing or pot. An electrical conductor and switch are connected with the motor and light source to selectively energize the same. Preferably, the motor is of reduced voltage such as 12 volts or more and the light source is a halogen light bulb or bulbs and the color wheel is a circular wheel with a plurality of radially extending, circumferentially spaced transparent color inserts which are sufficiently transparent and align with the bulb or bulbs as the wheel rotates to illuminate the exposed ends of the fiber optic strands with different colors to illuminate the fiber optic strands and change the colors of the tip ends of the fiber optic strands as the color wheel is rotated.

In the present invention, the necessity of extending a large number of fiber optic strands through a large main trunk when constructing a tall Christmas tree, such as 6 to 8 feet, is avoided. Instead, the supporting housing or pot into which extend the lower end of the fiber optic strands of the top section, is elevated and supported on the upper end of a pole or pipe. The pole or pipe serves as an elongated main trunk for the bottom section of the tree. The elongated main trunk has a stand at its bottom end with the housing or pot for the top tree section secured to the upper end. The elongated trunk is preferably hollow to provide passage of an insulated conductor for a source of electrical energy to the motor and light bulb in the elevated housing or pot.

In one embodiment of this invention, the housing or pot includes a pair of spaced, generally parallel plates each of which has a plurality of circumferentially spaced and aligned openings. The lower section of the Christmas tree below the integrated top section includes a plurality of branches or panels each of which includes a substantially rigid wire member having a down turned hook at its upper end. The down turned hook includes a terminal end portion which can be inserted through a pair of aligned openings in the plates thereby supporting each of the branches or panels in a downwardly, outwardly inclined relation. Each of the branches or panels includes a plurality of wire stems each including a large number of simulated needles of green shredded PVC attached thereto or mounted thereon. The terminal end of the down turned hook terminates below the lower plate in the pot and slightly above a color wheel. Each of the branches or panels of the bottom tree section includes a large number of fiber optic strands extending along the wire stems and along or through the rigid wire member in the branches or panels. The shredded PVC strips forming simulated needles wrap around the wire stems and wire member and fiber optic strands. The terminal ends of the fiber optic strands are divided and positioned preferably in clusters, adjacent the tips of the simulated tree needles. The other or base end of the large number of fiber optic strands for each branch or panel is wrapped around and secured to or extend through the down turned hook end of the rigid wire member. As such, the base ends of the fiber optic strands are exposed to the area immediately above the color wheel and in alignment with the colored segments to illuminate the exposed base ends of the fiber optic strands with different colors. These colors are then transmitted to the terminal ends of the strands.

Thus, when the color wheel rotates and the light bulb is energized, the color wheel will sequentially illuminate the fiber optic strands in both the top tree section and the bottom tree section of the Christmas or other decorative tree. Both the exposed ends of the fiber optic strands in the lower end of the top tree section and the base ends of the fiber optic strands on the downwardly and outwardly inclined long branches or panels may be eccentric in relation to the rotational axis of the color wheel. As such, the colored segments of the color wheel will sequentially illuminate the fiber optic strands in both the top section and lower section of the tree in accordance with the color sequence of the transparent colored segments of the color wheel.

As a variation of this embodiment of the present invention, the trunk of the bottom section of the tree has an apertured support plate below the color wheel housing to receive a support hook on a rigid wire support for each panel. The fiber optic strands extend upwardly and extend downwardly into the color wheel housing for illumination of the ends of the fiber optic strands.

In another embodiment of the present invention, the top tree section is the same as in the first embodiment. However, the lower tree section of the plurality of circumferentially spaced artificial branches or panels which include the stems of wire and shredded PVC to form needles, are without the fiber optic strands. The stems are attached to a rigid wire member having a downwardly opening hook at its upper end to engage with a apertured plate or ring at the upper end of the main trunk. Each panel has a smaller wire member attached to the rigid wire member with a plurality of twist wire loop or similar attachment structure. The smaller wire member has a plurality of wire stems attached thereto and a plurality of fiber optic strands which extend through the needles on the stems on the artificial branches to an observable position. The upper end of each smaller wire member and the fiber optic strands attached thereto extend downwardly into a separate housing adjacent the pot or housing supporting the top tree section. Each individual housing includes a motor driven color wheel and light source similar to that in the pot of the top tree section thereby illuminating the terminal end of each fiber optic strand with different colors as the color wheel is rotated.

It is therefore an object of the present invention to provide an artificial Christmas tree or other decorative tree having a height ranging approximately from 6 to 8 feet and above, in which changeable color terminal ends of a large number of fiber optic strands are located adjacent tip ends of simulated needles throughout the vertical and circumferential extent of the tree.

Another object of the invention is to provide a fiber optic Christmas tree including a top section and a bottom section with a large number of fiber optic strands terminating above a rotatably driven color wheel and light source located in elevated position in order to eliminate the necessity for all of the fiber optic strands to extend to the lower end of the tree trunk thereby enabling the tree trunk to be of relatively smaller diameter and thus less observable and also reducing the cost by using shorter fiber optic strands.

A further object of the invention is to provide a fiber optic Christmas tree in accordance with the preceding objects in which the top section of the tree is an integrated unit having a trunk constructed of a large number of fiber optic strands with their terminal ends adjacent the tips of simulated needles in the top section of the tree.

Still another object of the invention is to provide a fiber optic Christmas tree in accordance with the preceding objects in which the lower section of the tree includes a plurality of circumferentially spaced, downwardly and outwardly inclined branches or panels. In a first embodiment, the upper ends of the branches and the fiber optic strands attached thereto have downwardly opening supporting hooks at its upper end supported from a housing having a motor driven color wheel and light source oriented in elevated relation to the lower end of the tree. The fiber optic strands from both the top section and the lower section of the tree terminate in exposed ends oriented above and in alignment with color segments of the color wheel with the light source illuminating the terminal ends of the fiber optic strands with different colors which are transmitted to the ends of the strands adjacent the tips of the needles.

A still further object of the invention is to provide a fiber optic Christmas tree in which the lower section of the tree includes a plurality of circumferentially spaced, downwardly and outwardly inclined branches or panels such as used in a conventional artificial Christmas tree. In a second embodiment, the upper ends of the branches have a downwardly opening hook at an upper end supported from an apertured plate or ring oriented at an elevated position and either incorporated into the pot or housing for the top section of the tree or supported on the trunk of the Christmas tree at an elevated position. Each of the branches includes a smaller wire attached to the rigid wire of the branches by a plurality of wire ties or other attachment structure. The smaller wire member includes a plurality of stems having fiber optic strands secured thereto which extend along the smaller wire member into a separate housing attached to the smaller wire member. The separate housing includes a motor driven color wheel and light source similar to that in the first embodiment so that each individual panel will have a plurality of fiber optic tips associated with the artificial needles in the panel and provided with its own housing, color wheel and light source.

Yet another object of this invention is to provide a fiber optic Christmas tree in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a detailed view of the Christmas tree shown in FIG. 1 with the supporting housing for the branches or panels forming the bottom section of the tree and illustrating the relation of the color wheel, light source and hook ends of the panels and exposed ends of the fiber optic strands.

FIG. 4 is a detailed plan view of the housing of the Christmas tree shown in FIG. 1 illustrating the openings in spaced plates for receiving the downwardly extending hooks at the upper end of the branches or panels.

DESCRIPTION OF THE PREFERRED EMBODIMENT

Figure 1:
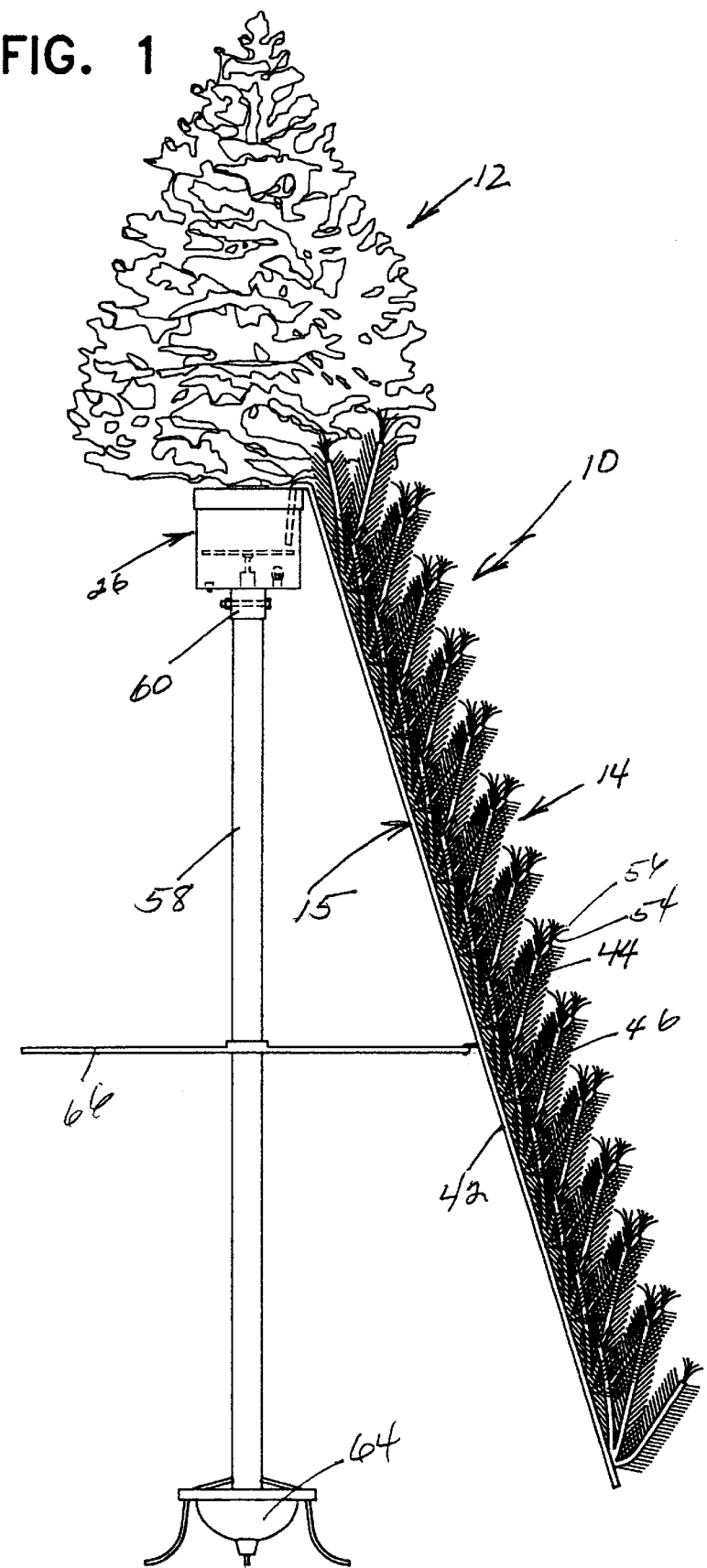
FIG. 1 is a side elevational view of the top section of a fiber optic Christmas tree in accordance with a first embodiment of the invention together with a portion of the bottom section of the tree and the main trunk supporting all of the tree from a supporting stand.

Although only three preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Referring now to the drawings, the first embodiment of the fiber optic artificial Christmas tree of the present invention is generally designated by the reference numeral 10.

The artificial tree includes a fiber optic top section generally designated by the reference numeral 12 and a fiber optic lower section generally designated by the reference numeral 14 formed by a plurality of branches of panels 15. Only a single branch or panel 15 of the bottom section 14 is illustrated with it being pointed out that a plurality of the branches or panels 15 will be supported to form a complete Christmas tree with the periphery of the bottom section 14 forming a continuation of the generally conical configuration of the top section 12. The Christmas tree of the present invention can have a full height of generally 6 to 8 feet, and even higher.

The top section 12 is an integrated structure in the form of an existing short fiber optic Christmas tree presently on the market and includes a main trunk 16 having a plurality of branch stems 18 thereon each with a plurality of simulated needles 20. The main trunk 16 is preferably a plurality of fiber optic strands 22 which may be glued together or positioned in a protective pipe or tube. The strands 22 extend up the trunk 16 and are generally arranged in clusters or bundles which are diverted to extend along the stems 18. Each fiber optic strand cluster terminates in the needles 20 around the tips of the stems 18. The other or base end of the strands 22 terminate at the bottom of the trunk 16 with the ends of the fiber optic strands 22 being exposed as indicated at 23. The trunk 16 is telescoped into a socket 24 in the upper end of a housing or pot 26.

The housing 26 includes a generally cylindrical wall 28, a flat bottom 30 and a pair of vertically spaced, generally parallel plates 32 and 34 forming a closure for the upper end of the housing 26. The plates 32 and 34 include a cylindrical connector 35 which defines the socket 24. This socket 24 is preferably offset from the center of the housing 26 and offset from the center of rotation of a circular color wheel 36 supported and driven by an electric motor 37. A plurality of light bulbs 38 are supported on the bottom of the housing 26 in alignment with the portion of the color wheel 36 that has transparent colored segments incorporated therein. Hence, as the light source shines through the color wheel, the corresponding color of the transparent segment will illuminate the eccentrically positioned exposed ends 23 of the strands 22 and the colored illumination is transmitted through the fiber optic strands 22 to the terminal ends 39 thereof adjacent the tips of the simulated needles 20. Since the strands 22 are preferably in a cluster arrangement, a continuously changing color of the terminal ends 39 of the fiber optic strands 22 will be provided. A source of electrical energy is supplied to the motor 37 and light bulb 38 through a suitable electrical circuit including a switch 35 and a transformer (not shown) to reduce the voltage and otherwise constructed in a conventional manner. The above described structure for the top section 12 of the present invention is basically the same as a commercially available short fiber optic Christmas tree.

However, in the present invention, the plates 32 and 34 include a plurality of circumferentially spaced apertures 40 with the apertures in the lower plate 34 preferably being slightly radially inwardly from the apertures in the top plate 32 but generally in alignment therewith. The apertures in plates 32 and 34 are generally aligned to receive the downwardly opening hook end 41 of elongated rigid members 42. Rigid members 42 are typically in the form of heavy wire or the like forming each of the branches or panels 15 of the bottom section 14 of the Christmas tree. The rigid member 42 includes a plurality of stems 44 extending upwardly therefrom with each stem including a plurality of simulated needles 46 mounted thereon. The stems 44 are somewhat flexible and bendable to enable them to be oriented in optimum relation to each other to provide a full appearance to the bottom section of the Christmas tree. The downwardly facing hook 41 is inserted through the holes 40 to support the branches 15 from housing or pot 26.

Figure 5:
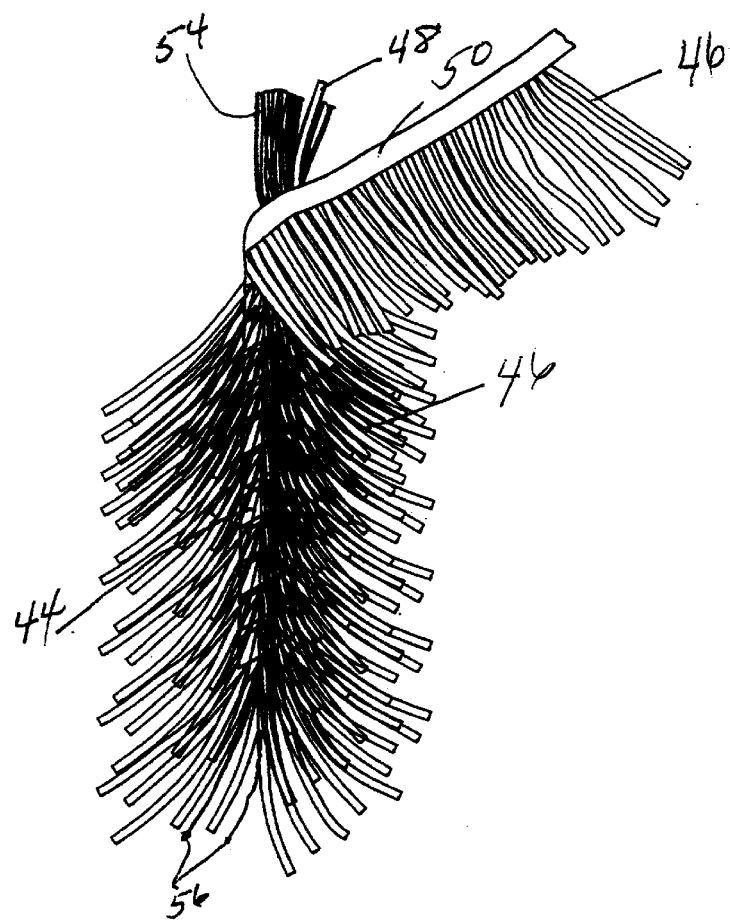
FIG. 5 is a detailed plan view of one of the stems used in both the top and bottom sections of the Christmas tree shown in FIG. 1 illustrating the association of the shredded PVC needles, the fiber optic strands and the core wire.
Figure 6:
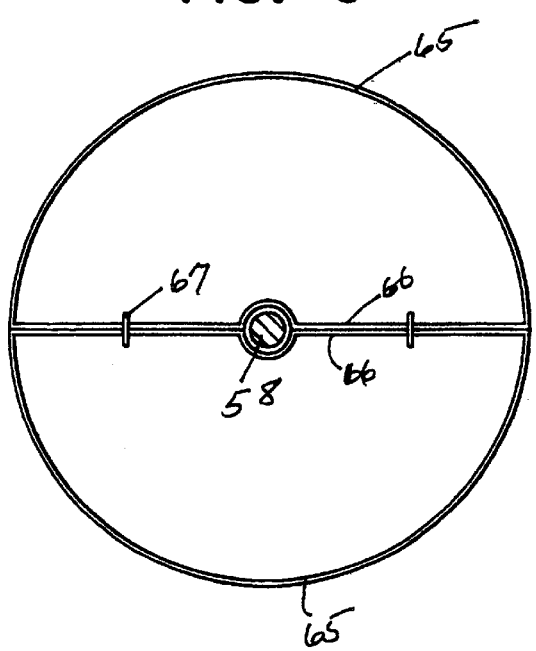
FIG. 6 is a detailed plan view illustrating the supporting ring for the downwardly inclined panels in the bottom section of the Christmas tree shown in FIG. 1.

FIG. 5 illustrates the details of a stem 44 in a branch or panel 15 of the bottom section 14 as well as a stem 18 in the top section 12 of the tree. The stem 44 includes a core wire 48 of substantially rigid but bendable metal. Wound spirally on the wire 48 is a green PVC strip 50 shredded to form a plurality of green simulated needles 46 which, when assembled on the wire 48 extend radially in a random pattern to simulate a Christmas tree branch. The structure of the stems 44 is conventional and well known in the construction of artificial Christmas trees. However, as illustrated in FIG. 5, a plurality of fiber optic strands 54 have been incorporated into each stem 44 by positioning a plurality of strands 54 alongside the wire core 48. The bundle of strands 54 may vary in number and are preferably positioned around the circumference of the wire 48 and inwardly of the spirally wound strip 50 so that the ends of the strip 50 when secured in position will retain the fiber optic strands 54 along the wire. The terminal ends of the strands 54, designated by reference numeral 56, are preferably oriented at the outer end of the stem 44 and adjacent the tip ends of the simulated needles 46 defined by the shredded area of the green strip 50. The plurality of fiber optic strands 54 are thus arranged in clusters adjacent the outer end of the stem 44.

Figure 3:
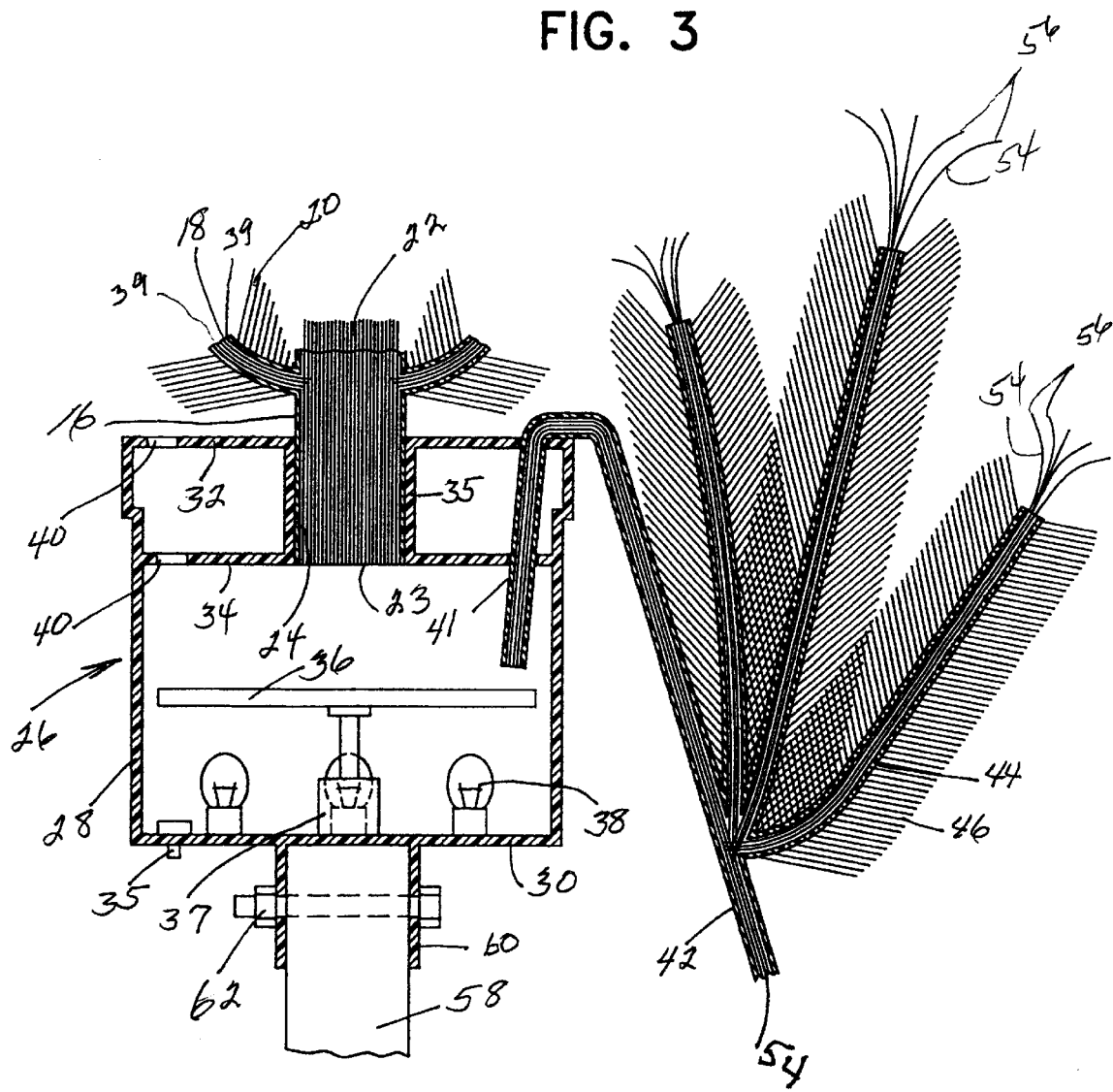
FIG. 3 is an enlarged sectional view of the Christmas tree shown in FIG. 1 illustrating the construction of the housing and the association of the lower end of the top section and of the upper ends of the branches or panels with respect to the housing, the color wheel and light source.

The fiber optic strands 54 and the core wires 48 of the stems 18 and 44 are secured to the rigid wire member 42 in a manner similar to the manner in which the strands 54 are secured to the core wire 48 by using a spirally wound shredded strip 50 or a spirally wound narrow green strip. In either case, the spirally wound strip secures the fiber optic strands 54 to the rigid wire 42 on the exterior thereof with the spirally wound retaining strip extending throughout the length of the rigid wire 42 including the down turned hook 41 so that all of the fiber optic strands 54 terminate above the color wheel 36 as illustrated in FIG. 3. By this arrangement, rotation of the color wheel 36 and energization of the light bulb or bulbs 38 will change the colors transmitted to the strands 54 in the bottom section 14 of the tree as well as the fiber optic strands 22 in the top section 12 of the tree. The color wheel includes differently colored transparent sections. A single halogen light bulb 38 may be employed or a plurality may be employed to provide sequential color variations at the tip ends of the fiber optic strands.

Usually, no more than ten branches or panels 15 are used to form the bottom section 14 and, in most instances, six to eight branches 15 are adequate. As indicated above, a single light bulb 38 can be used or a bulb 38 can be placed under the color wheel 36 in alignment with each of the terminal ends of the downwardly opening hooks 41 to provide multiple color changes to the tip ends 56 of the fiber optic strands 54 and the tip ends 39 of the fiber optic strands 22.

In accordance with the present invention, all of the fiber optic strands terminate at an elevated position in relation to the bottom of the Christmas tree. This arrangement enables the housing 26 and all of the operating structure to be supported from the top of a tree trunk 58 such as by having an upper end of trunk 58 inserted into a downwardly extending sleeve or collar 60 on the housing 26 and secured thereto by a transverse bolt 62. Other conventional attaching structure could be utilized. The lower end of the trunk 50 is supported in a conventional manner from a conventional Christmas tree stand 64. Intermediate the vertical length of the trunk 58 is a pair of semicircular wire members 65 having base portions 66 receiving the tree trunk 58 and secured thereto by slide rings 67. The periphery of rings 65 engage an inner surface of the rigid member 42 intermediate its length to support the branches or panels 15 of the bottom section 14 in an outwardly inclined orientation to complete the conical configuration of the tree 10 in a manner well known in conventional artificial Christmas tree construction. This enables disassembly of the rings 65 as well as disassembly of the bottom section branches or panels 15 and the top section 12 so that the entire tree may be stored in a compact condition.

The orientation of the housing or pot 26 at the top of the bottom section 14 of the Christmas tree enables the top section 12 to function by the color wheel 36 and light bulbs 38 illuminating all the fiber optic strands 22 in the top section 12. At the same time, the color wheel 36 and light bulbs 38 illuminate all of the fiber optic strands 54 in the bottom section 14 without any of the fiber optic strands passing downwardly through the trunk 58. By eliminating the fiber optic strands from the trunk 58, the trunk 58 can remain relatively small in diameter as compared to the size of a trunk that would be required to receive all of the fiber optic strands therethrough for both the top and bottom sections of the tree.

Figure 7:
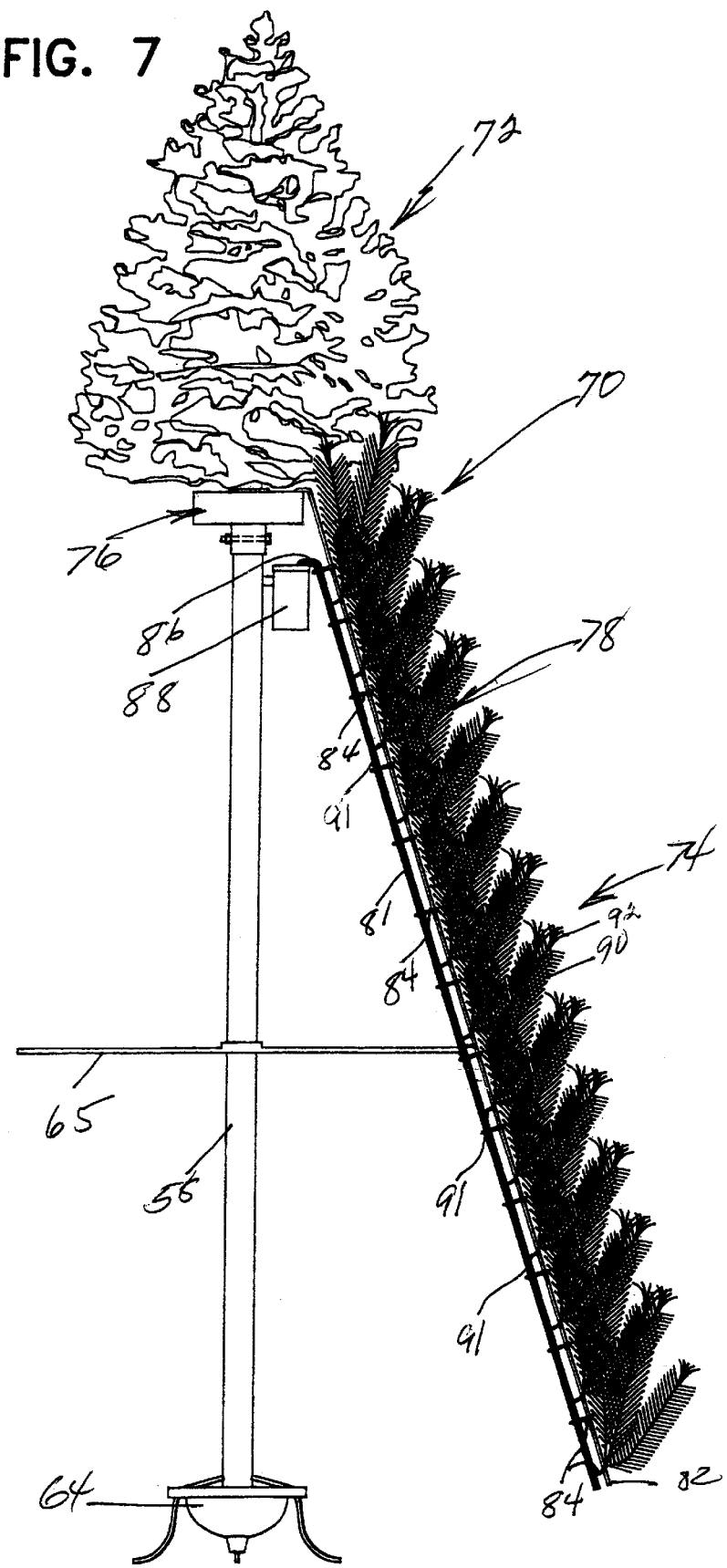
FIG. 7 is a side elevational view similar to FIG. 1 but illustrating a second embodiment of the fiber optic Christmas tree in accordance with the present invention.

FIG. 7 illustrates another embodiment of the invention generally designated by reference numeral 70 which includes a top section and a bottom section generally designated by the reference numerals 72 and 74, respectively. The top section 72 is the same as the top section 12 as previously described in FIG. 1. Top section 72 includes the same supporting housing 76 as the housing 26 in FIG. 1 and includes a color wheel and light source for illuminating the tip ends of fiber optic strands in the top section 72 in the same manner as in FIGS. 1–6. In this embodiment of the invention, the bottom tree section 74 includes a plurality of branches or panels 78 which are conventional artificial Christmas tree panels without fiber optic strands. However, each of the panels 78 includes an elongated fiber optic assembly, generally designated by the reference numeral 80 attached to the rigid wire 82 of the conventional panel 78 by a plurality of wire ties 84 or other attachment means so that the fiber optic assembly 80 extends in generally parallel, closely spaced relation to the rigid wire 82 throughout the length of the panel 78. The upper or base end of the fiber optic assembly 80 terminates below the housing 76 and includes a downwardly opening hook 86 at its upper end which extends into a housing 88 which includes a color wheel and light source in the same manner as the housing 26. In this construction, each panel or branch 78 can include a separate housing, motor driven color wheel and light source.

The fiber optic assembly 80 includes a small supporting wire 81 and plurality of fiber optic strands 90 incorporated therein. The strands have stems 91, which extend into the branches and needles of panels 74 and terminate in tip ends 92. the other ends of strands 90 extend along the small wire 80 into the housing 88 for changing color illumination of the fiber optic strands. Thus, each of the branches or panels 78 which in and of themselves are conventional includes an attachment in the form of the fiber optic assembly 80. The assembly 80 is secured adjacent to the rigid wire 82 by the flexible wire ties or other securing means so that the stems 90 can be positioned with the terminal ends of the fiber optic strands in clusters in relation to the flexible stems on the branches 78. This arrangement enables each of the branches to be individually illuminated with a single light source and color wheel functioning to change the colors in the lower section 74 of the tree 70. This individual illumination for each branch or panel 78 may be synchronized or not with respect to the colors on the other panels 78 as well as the colors on the upper section 72 of the tree thereby enabling specific control of the colors of the tip ends of the fiber optic strands to enhance the unique changing color characteristics of the sections of the Christmas tree.

Figure 8:
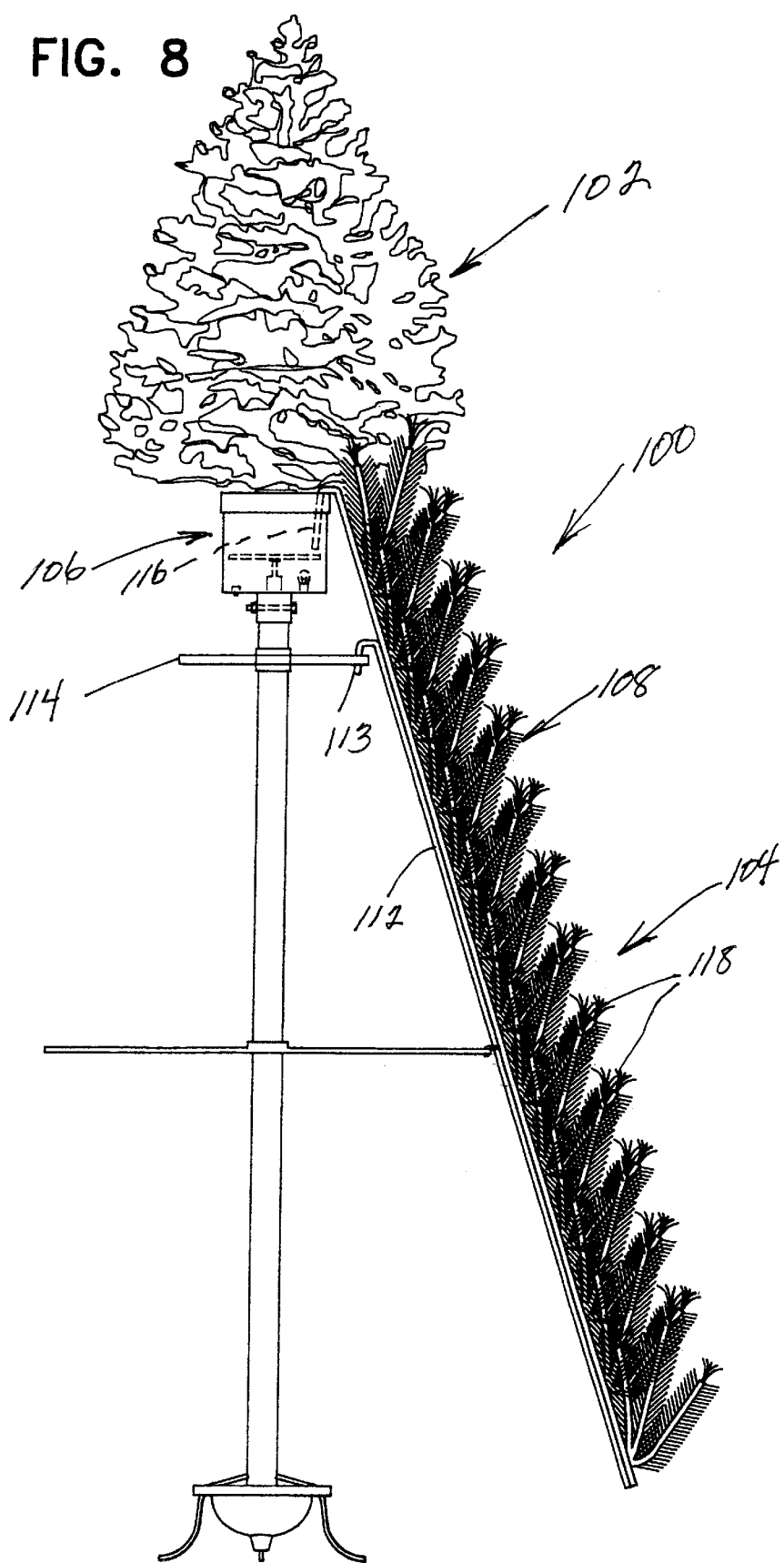
FIG. 8 is a side elevational view similar to FIG. 7 but illustrating another embodiment of the present invention in which the supporting wire or rod for each panel is supported from a plate on the pole and only the fiber optic strands extend into the color wheel housing.

FIG. 8 illustrates yet another embodiment of the invention and is similar to FIG. 1. The tree generally designated by reference numeral 100 includes a top section and a bottom section generally designated by the reference numerals 102 and 104, respectively. The top section 102 is the same as top section 12 as previously described in connection with FIG. 1. Top section 102 includes a supporting housing 106 which is the same as the housing 26 in FIG. 1 and includes a color wheel and light source for illuminating the tip ends of fiber optic strands in the top section 102 in the same manner as the structure in FIG. 1. In this embodiment of the invention, the bottom tree section 104 includes a plurality of panels 108 which are conventional artificial Christmas tree panels without fiber optic strands. However, each of the panels 108 includes an elongated fiber optic assembly, generally designated by the reference numeral 110, which is attached to a rigid wire or rod 112 of the panel 108 by a plurality of wire ties or other attachment means so that the fiber optic assembly 110 extends in generally parallel, closely spaced relation to the rigid wire 112 throughout the length of the panel 108. The upper end of the fiber optic assembly 110 terminates in a downwardly opening hook 116 at its upper end which extends into housing 106 which includes the color wheel and light source in the same manner as the housing 26.

The fiber optic assembly 110 includes a plurality of fiber optic strands which extend into the branches and needles of panels 104 and terminate in tip ends 118. The other ends of the strands extend along the wire 112 and upwardly into hook 116 and into the housing 106 for changing color illumination of the fiber optic strands. Thus, each of the branches or panels 108 includes attachment of the fiber optic assembly 110 to wire rod 112. The wire rod 112 has a downwardly opening hook 113 located below housing 106 and supportingly engaged with an aperture of plate 114 secured to trunk 68 as in FIGS. 1 and 2. This arrangement enables each of the branches to be individually illuminated with a single light source and color wheel functioning to change the colors in the lower section 104 of the tree 100. This individual illumination for each branch or panel 108 may be synchronized or not with respect to the colors on the other panels 108 as well as the colors on the upper section 102 of the tree thereby enabling specific control of the colors of the tip ends of the fiber optic strands to enhance the unique changing color characteristics of the sections of the Christmas tree.

Electrical power may be supplied to the motor 37 and bulbs 38 by an electrical conductor extending through the trunk 58 with the power supply being reduced to 12 volts, more or less, in order to reduce the shock hazard. Suitable switching can also be provided in a conventional manner. The assembly of the tree and disassembly thereof is substantially the same as a conventional artificial Christmas tree having height of approximately 6 to 8 feet. The top section 12, 72 or 102 is first lifted out of the bottom section, and then each of the branches or panels 15, 78 or 108 which form the bottom section 14, 74 or 104 is lifted out of their supporting structure. The stand 64 is then removed and the trunk 58 separated from the housing 26, 76 or 106 thus enabling all of these components to be easily stored in a suitable container in a compact condition.

As an alternative to individual housings 88 as shown in FIG. 7, each of the fiber optic assemblies 80 may be associated with an annular housing and color wheel supported on the upper end of the trunk 58 in a manner similar to FIG. 1. The annular color wheel can be driven by a motor and each small wire 81 would have a hook 86 at its upper end which extends into the annular housing. This structure enables all of the fiber optic assemblies 80 to be illuminated from a single housing color wheel and motor located below housing 76 which supports panels 78.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A fiber optic artificial Christmas tree comprising a top section and a bottom section, said top section including a trunk constructed with a plurality of branch stems, simulated needles on said branch stems, a plurality of fiber optic strands having one end terminating adjacent tip ends of the needles adjacent outer ends of said branch stems, said strands extending along the branch stems and the trunk with the other end terminating at a lower end of the trunk, said bottom section of the tree including a plurality of independent panels each including a rigid wire member having a downwardly opening hook at its upper end and a plurality of stems and simulated needles throughout its length, a plurality of fiber optic strands on each panel, each strand including one terminal end adjacent tip ends of the simulated needles, the other end of the fiber optic strands on the bottom section terminating at the terminal end of the hook on each of the panels, a housing supported in elevated relation to the Christmas tree by a supporting trunk, said housing supporting the bottom section and upper section of the tree, said housing having an interior to which said other terminal ends of all of the fiber optic strands are exposed, a rotatable color wheel in said housing below the exposed terminal ends of the fiber optic strands, and a light source under the color wheel, said color wheel having a plurality of transparent differently colored areas, said light source illuminating the colors as the color wheel is driven thereby illuminating the exposed ends of fiber optic strands and illuminating the terminal ends of the fiber optic strands adjacent the tips of the simulated needles with different colors.

2. The Christmas tree as defined in claim 1, wherein said housing includes a pair of spaced plates with a plurality of vertically spaced, generally aligned apertures therein for receiving a depending end of the hook at the upper end of each of said branches of the bottom section of the tree to enable the branches to be assembled and disassembled.

3. The Christmas tree as defined in claim 1, wherein said bottom section of the tree includes an annular ring engaging the inner surface of each of the branches to maintain them in downwardly inclined relation to define a portion of the conical configuration of the tree, said ring being detachably supported from the trunk for supporting engagement with the branches forming the bottom section.

4. The Christmas tree as defined in claim 1, wherein said housing includes a vertical socket telescopically, frictionally and detachably supporting said top section main trunk, said socket having an open bottom end disposed above the color wheel to expose the exposed ends of the fiber optic strands in the top section to different illuminated colors as the color wheel rotates.

5. The Christmas tree as defined in claim 2, wherein said other end of said fiber optic strands in the bottom section of the tree terminate in exposed ends at lower ends of said hooks below the lower of said plates and above said color wheel.

6. A fiber optic artificial Christmas tree comprising a top section and a bottom section, said top section including a tubular trunk supporting a plurality of branch stems, simulated needles on said branch stems, a plurality of fiber optic strands having one end terminating adjacent tip ends of the needles and extending downwardly in the trunk with the other end terminating at a lower end of the trunk, said bottom section including a plurality of independent branches each including a rigid wire member having a downwardly opening hook at its upper end and a plurality of stems and simulated needles throughout its length, each branch in the bottom section of the tree including a wire, smaller than the rigid wire member, supported in generally parallel, closely spaced relation to the rigid wire member, said smaller wire including a plurality of fiber optic strands mounted thereon with the fiber optic strands extending into the stems and simulated needles on each branch and terminating adjacent the tip ends of the simulated needles, an upper end of said smaller wire terminating in a downwardly opening hook below the open end hook on the rigid wire member and extending into a housing having a rotatable color wheel and light source oriented below the top section of the tree, said top section of the tree including a housing supported above the hooks on the bottom section of the tree by a trunk supported at its lower end by a Christmas tree stand, said housing of the top section of the tree including a color wheel rotatably driven by a motor with a light source under the color wheel for illuminating the fiber optic strands in the top section thereby providing changing color tip ends of fiber optic strands with different colors throughout the peripheral area of the top and bottom sections of the Christmas tree.

7. The Christmas tree as defined in claim 6, wherein said housing for the top section of the tree includes a support for the independent branches forming the bottom section of the Christmas tree thereby supporting the branches of the bottom section of the Christmas tree independently of the housing associated with the fiber optic strands in the bottom section of the Christmas tree, the housing associated with the fiber optic strands and the wire associated with the fiber optic strands in the bottom section of the tree being supported solely from the rigid wire member of the independent branches forming the bottom section of the Christmas tree.

8. The Christmas tree as defined in claim 1, wherein said supporting trunk is supported at its lower end by a Christmas tree stand.

9. A Christmas tree comprising a generally conical top section and a bottom section forming a continuation of the conical configuration of the top section, each of said sections including artificial branches with simulated needles, a plurality of fiber optic strands incorporated into at least some of said branches in each of said top section and said bottom section with a first end of said strands terminating adjacent certain of said needles, said strands having a second end terminating in an elevated exposed position interiorly of a housing supported at an upper end of a supporting tree trunk, a light source mounted in said housing below said second end of said strands to illuminate said strand second ends and transmit illumination through said fiber optic strands to said first strand ends and provide illumination adjacent said needles, a driven rotatable color wheel having multiple different transparent color areas positioned between the light source and said second ends of said strands to provide changing color illumination of said first ends of said strands adjacent the needles.

10. A Christmas tree in accordance with claim 9, wherein said tree trunk includes a branch support member thereon below said housing and supporting each of said branches forming the bottom section of said tree.

11. A Christmas tree in accordance with claim 10, wherein said support member on each branch includes an elongated substantially rigid wire member extending along a major portion of each branch in the bottom section of the tree, said wire member on each branch including an upper end supported from said tree trunk in spaced relation to said housing.

12. A Christmas tree in accordance with claim 11, wherein said tree trunk includes a laterally extending support engaged by and supporting the upper end of said rigid wire member on each branch thereby supporting all of the weight of each branch forming the bottom tree section from said tree trunk.

13. A Christmas tree in accordance with claim 12, wherein said laterally extending support on the tree trunk is mounted below said housing, the upper end of each wire member including a downwardly opening hook engaged with an opening in said laterally extending support.

\* \* \* \* \*